United States Patent
Foy et al.

(10) Patent No.: US 9,027,342 B2
(45) Date of Patent: May 12, 2015

(54) SUPPLEMENTARY INTERCOOLER FOR INTERNAL COMBUSTION ENGINES

(75) Inventors: Nicholas Frederick Foy, Caddo Mills, TX (US); Ursula Meta Foy, Caddo Mills, TX (US)

(73) Assignees: Nicholas Frederick Foy, Caddo Mills, TX (US); Ursula Meta Foy, Caddo Mills, TX (US)

( * ) Notice: Subject to any disclaimer, the term of this patent is extended or adjusted under 35 U.S.C. 154(b) by 503 days.

(21) Appl. No.: 13/452,540

(22) Filed: Apr. 20, 2012

(65) Prior Publication Data

US 2012/0266592 A1 Oct. 25, 2012

Related U.S. Application Data

(60) Provisional application No. 61/517,504, filed on Apr. 21, 2011.

(51) Int. Cl.
- *F02B 29/04* (2006.01)
- *C25B 15/02* (2006.01)
- *C25B 15/00* (2006.01)

(Continued)

(52) U.S. Cl.
CPC ......... *F02B 29/0475* (2013.01); *F02B 29/0462* (2013.01); *F02B 37/00* (2013.01); *F02M 25/12* (2013.01); *F02M 27/04* (2013.01); *Y02T 10/121* (2013.01); *Y02T 10/146* (2013.01); *F28F 13/16* (2013.01); *F28C 3/04* (2013.01); *F28D 2021/0082* (2013.01)

(58) Field of Classification Search
CPC .... F02M 25/12; F02M 27/04; F02B 29/0462; F02B 29/0475; F02B 37/00; F28C 3/04; F28F 13/16; F28D 2021/0082; Y02T 10/121; Y02T 10/144; Y02T 10/146
USPC ......... 60/599; 123/1 A, 3, 563; 205/335, 628, 205/637; 204/194, 237, 241; 165/108
See application file for complete search history.

(56) References Cited

U.S. PATENT DOCUMENTS

| | | | |
|---|---|---|---|
| 2,926,276 A | 2/1960 | Moriya et al. | |
| 3,116,726 A | 1/1964 | Kwartz | |

(Continued)

FOREIGN PATENT DOCUMENTS

| | | | | |
|---|---|---|---|---|
| JP | 02102327 A | * | 4/1990 | ............. F02B 43/10 |
| JP | 2005007307 A | * | 1/2005 | ............. B01D 47/06 |

(Continued)

OTHER PUBLICATIONS

International Search Report dated Jul. 25, 2013 for International Application No. PCT/US2013/037401.

(Continued)

*Primary Examiner* — Thai Ba Trieu
(74) *Attorney, Agent, or Firm* — Peter V. Schroeder (57) ABSTRACT

A supplementary intercooler cools engine air after it has passed through the turbocharger of a vehicle's turbocharged internal combustion engine, but before it enters the engine. The unit has an inlet for capturing the turbo's air charge and an outlet for routing the air charge to the engine after passing through the intercooler. A container stores water until it is needed and a water pump transfers water from the container to the unit. This loosened bond of water is then sprayed on capacitor plates under turbo pressure to be converted into hydrogen and injected into the air intake stream making it a totally "hydrogen-on-demand" intercooler.

18 Claims, 7 Drawing Sheets

(51) Int. Cl.
  *C25C 1/02*  (2006.01)
  *F28F 13/06* (2006.01)
  *F02M 25/12* (2006.01)
  *F02M 27/04* (2006.01)
  *F28F 13/16* (2006.01)
  *F28C 3/04* (2006.01)
  *F02B 37/00* (2006.01)
  *F28D 21/00* (2006.01)

(56) References Cited

U.S. PATENT DOCUMENTS

| | | | |
|---|---|---|---|
| 4,373,494 A | 2/1983 | McMahon | |
| 5,071,532 A | 12/1991 | Taillet et al. | |
| 5,799,624 A * | 9/1998 | Hsieh | 123/3 |
| 5,893,423 A | 4/1999 | Selfors et al. | |
| 6,155,212 A * | 12/2000 | McAlister | 123/3 |
| 6,235,067 B1 | 5/2001 | Ahern et al. | |
| 6,311,650 B1 * | 11/2001 | Lamm | 123/3 |
| 6,350,376 B1 * | 2/2002 | Imaoka et al. | 165/108 |
| 6,609,564 B2 * | 8/2003 | Imaoka et al. | 165/108 |
| 6,659,049 B2 * | 12/2003 | Zagaja et al. | 123/3 |
| 6,698,389 B2 * | 3/2004 | Andrews et al. | 204/241 |
| 6,796,387 B1 * | 9/2004 | Lund et al. | 123/3 |
| 6,857,397 B2 * | 2/2005 | Zagaja et al. | 123/3 |
| 7,559,393 B2 | 7/2009 | Horii et al. | |
| 7,615,970 B1 | 11/2009 | Gimlan | |
| 8,048,276 B2 * | 11/2011 | Balestrino et al. | 204/237 |
| 8,100,093 B2 * | 1/2012 | Morgenstern | 123/3 |
| 8,347,645 B1 | 1/2013 | Miller | 62/236 |
| 8,608,915 B2 * | 12/2013 | McAlister | 204/266 |
| 2002/0022162 A1 * | 2/2002 | Kagitani | 429/17 |
| 2002/0166546 A1 | 11/2002 | Andrews et al. | |
| 2002/0185168 A1 * | 12/2002 | Hunt | 136/205 |
| 2006/0180101 A1 * | 8/2006 | Monette | 123/3 |
| 2007/0137590 A1 * | 6/2007 | Vetrovec | 123/25 A |
| 2007/0271751 A1 | 11/2007 | Weidman | |
| 2008/0047502 A1 * | 2/2008 | Morse | 123/3 |
| 2008/0087017 A1 * | 4/2008 | Van Nimwegen | 60/599 |
| 2008/0110421 A1 * | 5/2008 | Flessner et al. | 123/3 |
| 2008/0163618 A1 * | 7/2008 | Paul | 60/407 |
| 2009/0026087 A1 | 1/2009 | Sego | |
| 2009/0120414 A1 | 5/2009 | Hallenbeck | |
| 2010/0043730 A1 | 2/2010 | O'Bireck et al. | |
| 2010/0180838 A1 * | 7/2010 | Lewis et al. | 123/3 |
| 2010/0319635 A1 * | 12/2010 | Morgenstern | 123/3 |
| 2011/0174561 A1 | 7/2011 | Bowman | |
| 2011/0210008 A1 * | 9/2011 | Kumarasamy | 205/335 |
| 2011/0220039 A1 * | 9/2011 | Nowicki et al. | 123/3 |
| 2011/0220330 A1 | 9/2011 | Proepper | |
| 2012/0067304 A1 * | 3/2012 | Littmann | 123/3 |
| 2013/0061822 A1 * | 3/2013 | Adair | 123/3 |
| 2013/0177823 A1 * | 7/2013 | Nguyen et al. | 123/3 |
| 2013/0220240 A1 * | 8/2013 | Jonson et al. | 123/3 |

FOREIGN PATENT DOCUMENTS

| | | | | |
|---|---|---|---|---|
| KR | 20020042380 A | * | 6/2002 | C25B 1/04 |
| SU | 340132 A | * | 8/1972 | B01K 3/00 |
| WO | 0233769 A2 | | 4/2002 | |

OTHER PUBLICATIONS

Written Opinion dated Jul. 25, 2013 for International Application No. PCT/US2013/037401.

* cited by examiner

SUPPLEMENTARY INTERCOOLER FOR INTERNAL COMBUSTION ENGINES

CROSS-REFERENCE TO RELATED APPLICATIONS

This application claims the benefit of Provisional Patent Application Ser. No. 61/517,504, filed Apr. 21, 2011, by the present inventors, which is incorporated by reference herein.

BACKGROUND

This application relates generally to intercoolers, namely charge air coolers, for automotive use, and more particularly to intercoolers for forced induction internal combustion engines.

In a turbocharged engine, power is increased by providing air under pressure to the engine's cylinders. This allows an increased amount of fuel to be burned, producing more power.

A turbocharger pressurizes the air and also raises its temperature to 300 to 500 degrees. An intercooler (charge-air cooler, or CAC) reduces the air intake temperature before it goes into the engine. The result is less stress on the turbocharger(s) and engine parts. A decrease in air intake temperature provides a denser intake charge to the engine and allows more air and fuel to be combusted per engine cycle, increasing the output of the engine.

Injecting water into the air intake stream can help cool combustion as it vaporizes and turns into steam. Water can also be injected between the turbo and the intercooler. Introducing cool water into the intake stream before the intercooler can lead to a greater temperature drop before the intercooler, and cooler intake air temperatures.

Electrolysis of water is the decomposition of water into oxygen and hydrogen gas due to an electric current being passed through the water. An electrical power source is connected to two electrodes or two plates which are placed in the water. Hydrogen bubbles form on the negative side of the circuit (cathode) and oxygen bubbles appear at the positive side of the circuit (anode). Hydrogen does not like to be alone so it joins with oxygen right as it leaves the cell. This new gas is called oxyhydrogen (HHO). The terms oxyhydrogen (HHO) and hydrogen are often used interchangeably, even though they are not technically the same thing.

HHO generators electrolyze a small amount of water and pass it into the car's intake where it replaces some of the volume of gasoline or diesel, helps the engine to burn more cleanly with less deposits and puts out fewer emissions.

A hydrogen-on-demand system stores hydrogen gas as water until it is needed. The electricity used to convert water into hydrogen may come from the vehicle's alternator and batteries. Hydrogen-on-demand systems do not fuel the vehicle, instead the hydrogen is thought to speed up the combustion process. An acid, base or salt can be added to the water supply to drop the electrical resistance of the water. With a catalyst in the water, it takes less electricity to produce the desired amount of HHO gas.

SUMMARY OF THE INVENTION

The invention presents an improved apparatus and method for cooling engine air after it has passed through the turbocharger of a vehicle's turbocharged internal combustion engine, but before it enters the engine. In an embodiment, water and turbo heated air are forced through the unit and "oxy-hydrogen" steam is produced. Output from the unit enters the intake manifold introducing cooled hydrogenated steam air mass.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which.

DETAILED DESCRIPTION OF PREFERRED EMBODIMENTS

While the making and using of various embodiments of the present invention are discussed in detail below, a practitioner of the art will appreciate that the present invention provides applicable inventive concepts which can be embodied in a variety of specific contexts. The specific embodiments discussed herein are illustrative of specific ways to make and use the invention and do not limit the scope of the present invention.

Figure 1:
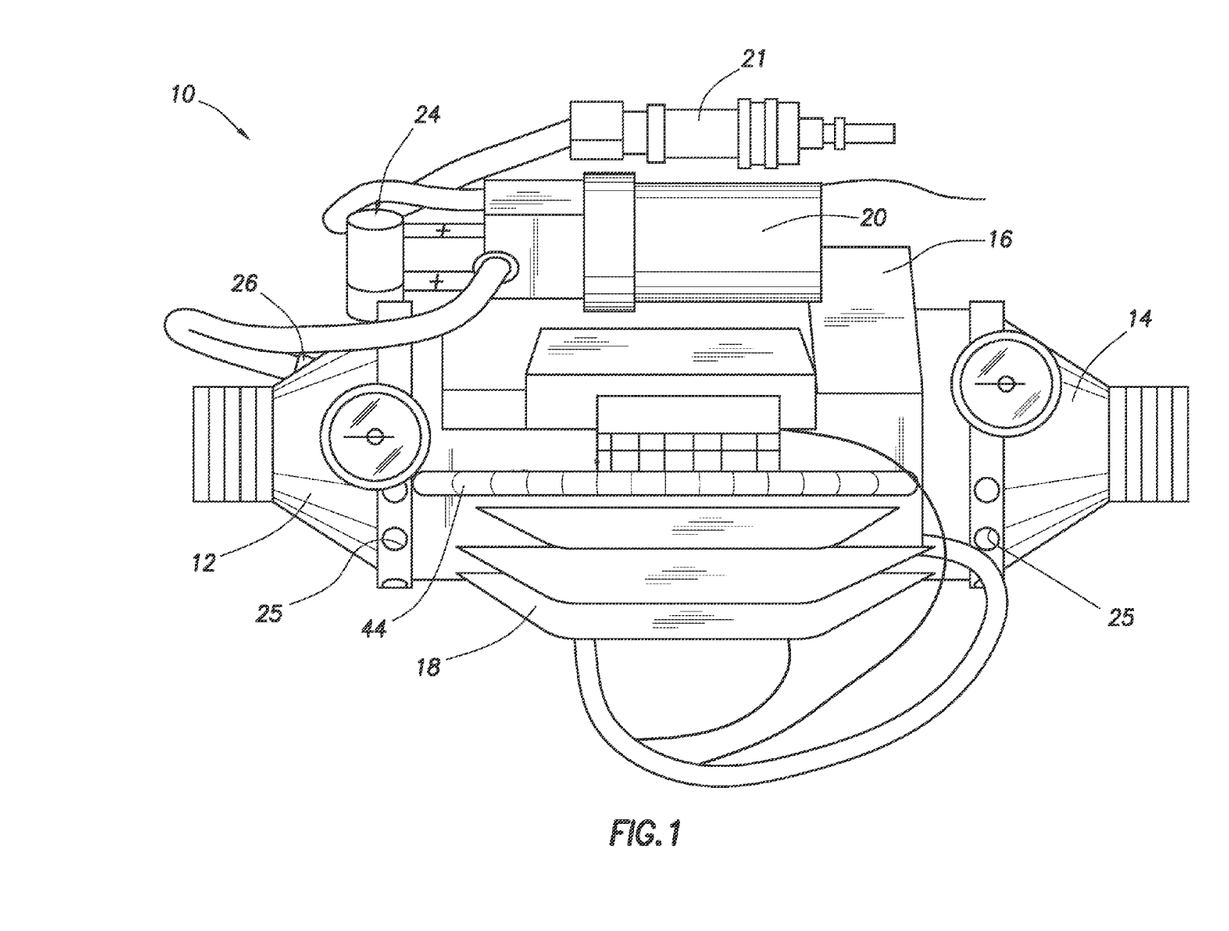
FIG. 1 is a side elevation view of a supplementary intercooler embodying principles of the present invention.

One embodiment of the supplementary intercooler is illustrated in FIG. 1. Intercooler 10 has a main body casing 11 and inlet cone 12 and outlet cone 14. Water is transferred from a water holding container (not shown in FIG. 1) by water pump 20 through filter 21 and injected into inlet cone 12 of the unit. The water may be positively charged such as by a 12 volt plate submerged in the water (not shown). The positively charged water is ideally insulated from ground until it reaches the negatively charged "injector nozzle" 26 in the intercooler 10. This in turn is sprayed onto the inner core plates. The injector nozzle 26 is preferably made of stainless steel and grounded with a ground strap. This arrangement is believed to loosen the bond between the hydrogen atom and the oxygen molecule in the water and assist in the hydrogen production.

In the example embodiment of FIG. 1, supplementary pressure is achieved by "capture" nozzle 42 allowing a selected portion (for example 33 ⅓%) of the turbo-pressure to be routed into the inlet 12 of the supplementary intercooler 10. The turbo pressurized air not passing through the unit can be diverted by bypass or equalizer tubes 44 which route the diverted air to the engine. In the example of FIG. 1, the equalizer tubes 44 go from one side of the unit to the other, and there are a total of four (4) tubes - two (2) tubes per side of the unit. The equalizer tubes may be used when not using an intercooler from the turbocharger to the supplementary intercooler, when all the air flow is moving through the unit before going into the engine, or when the unit is used on gasoline engines.

Figure 2:
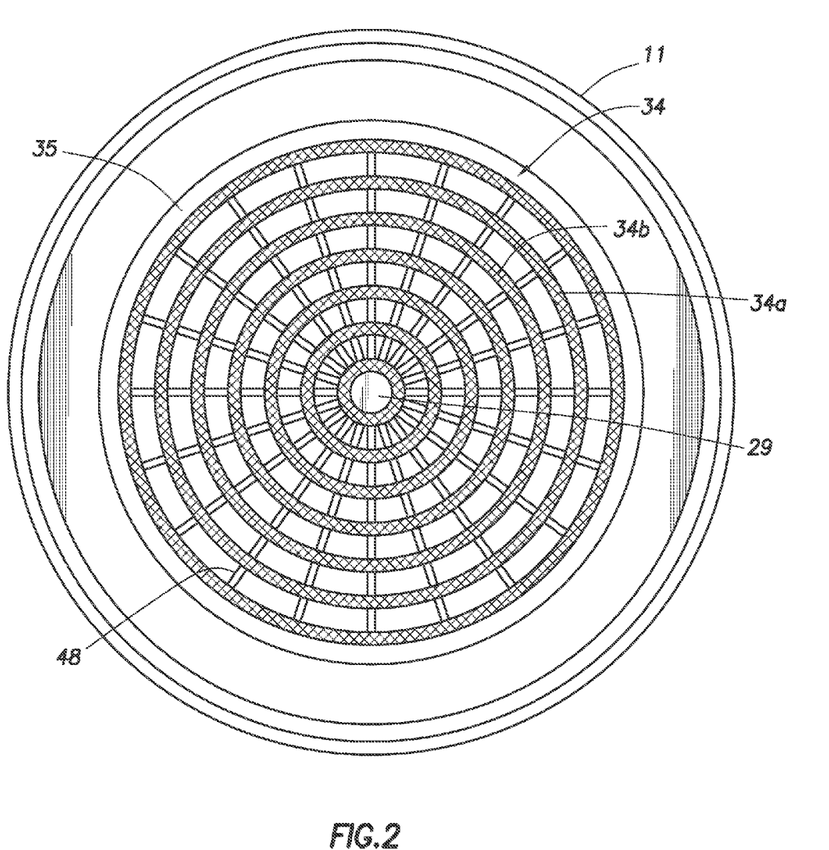
FIG. 2 is a sectional view through the main casing body of a supplementary intercooler as viewed from the inlet side, showing positively charged and negatively charged plates inserted therein, according to an embodiment.

FIG. 2 shows capacitor coils 34 comprising positive 34a and negative 34b plates inserted in main body casing 11 according to an embodiment. Turbo pressure is captured by nozzle 42 and routed into the inlet cone 12. As turbo heated pressure is being forced through the supplementary intercooler, the capacitor coils 34 heat up to produce "oxy-hydrogen" steam and moisture droplets. The water pump 20 and the capacitor coils 34 are activated by electric pressure activated switch 24. In one embodiment, the switch 24 is turned on at 2 psi turbo-pressure to transfer electrical power to the pump 20 and the capacitor coils 34.

In the example of FIG. 2, the positive plates 34a have a fiberglass screen mat covering the entire plate (matted front and back on all positive plates). This allows the water to linger on the positive plate 34a to make contact with the negative plate 34b. This then produces "oxy-hydrogen." The water is forced through the plates by turbo-pressure. The negative plates 34b consist of silicone spacers 48 attached to the plates (silicone spacers added on front and back of short plates and only on front of long plate). Each silicone spacer is 0.0028 (thousands) in thickness (height) and $13/64^{th}$ around and placed in strategic areas on both sides of the plates. There are 613 spacers per plate on each side of the plate. The plates 34 are configured alternating the negative to the positive, e.g., with a negative to a positive to a negative, etc. There is a 0.0028 (thousands) air gap between each plate. This roll is then inserted into main body casing 11. A magnetic "core" or rod 29 may be placed into the center of the capacitor coils. This rod is believed to assist in hydrogen production using lower amps to achieve the "oxy-hydrogen." The purpose is to maintain high voltage in the capacitor and it also allows air to move freely through the center.

Figure 7:
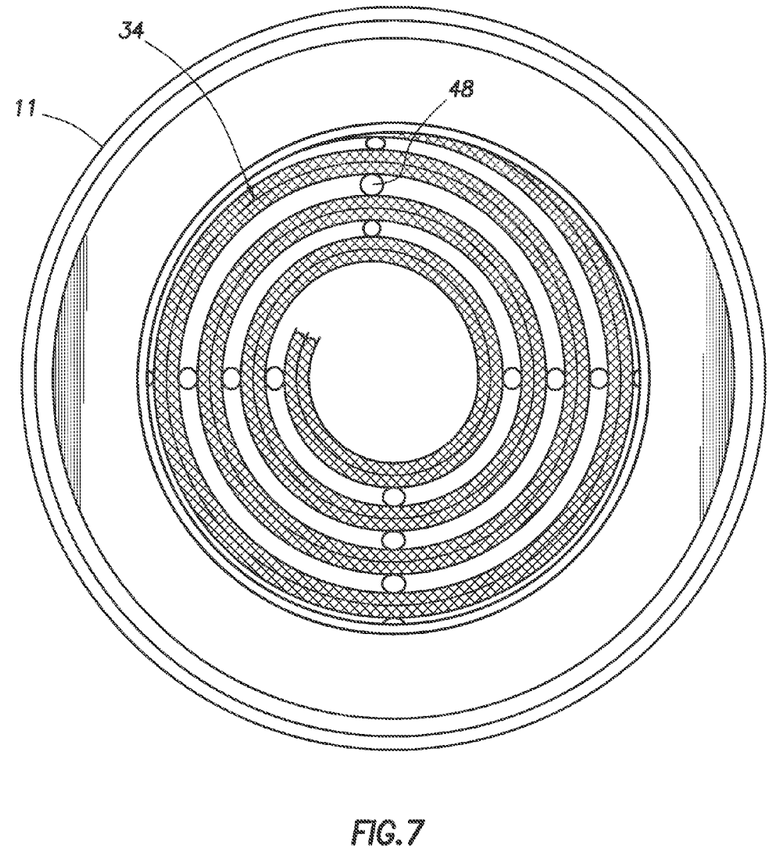
FIG. 7 shows plates of a supplementary intercooler in accordance with another embodiment.

FIG. 7 shows the positively charged and negatively charged plates in accordance with another embodiment. In one example, internal capacitor coils 34 consisting of five (5) plates, seven (7) inches wide, are wound together. The plates are rolled in a manner like that of electrolytic capacitors. They are rolled together into a four (4) inch diameter roll with a 0.0028 (thousands) air gap between each plate. This roll is then inserted into main body casing 11. In an embodiment, the metal used as the coil in the unit comprises an alloy of chromium, nickel, etc.

Preferably, there is a four (4) inch silicone "O" ring 35 placed in front of the capacitor coil 34 to keep the coils from grounding out to the inlet cone 12 that is threaded into the main casing 11. The entire casing unit consisting of the main body 11 and the in and out portions 12 and 14, is preferably made of aluminum. The inlet and outlet portions 12 and 14 are preferably removable with an "O" ring with each portion to prevent air leakage.

Figure 3:
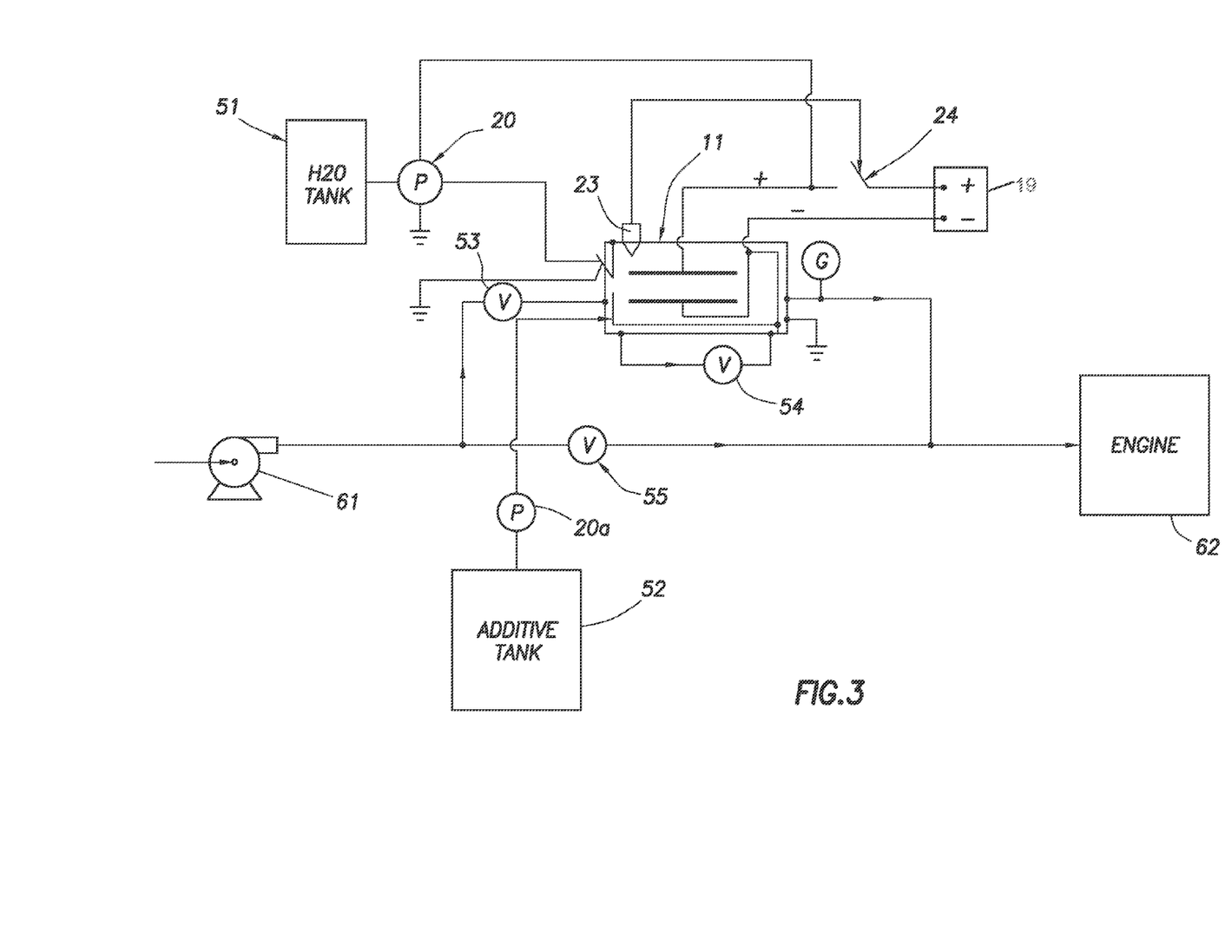
FIG. 3 is a schematic illustration of a supplementary intercooler system connected to the vehicle's electrical system, according to an embodiment.
Figure 4:
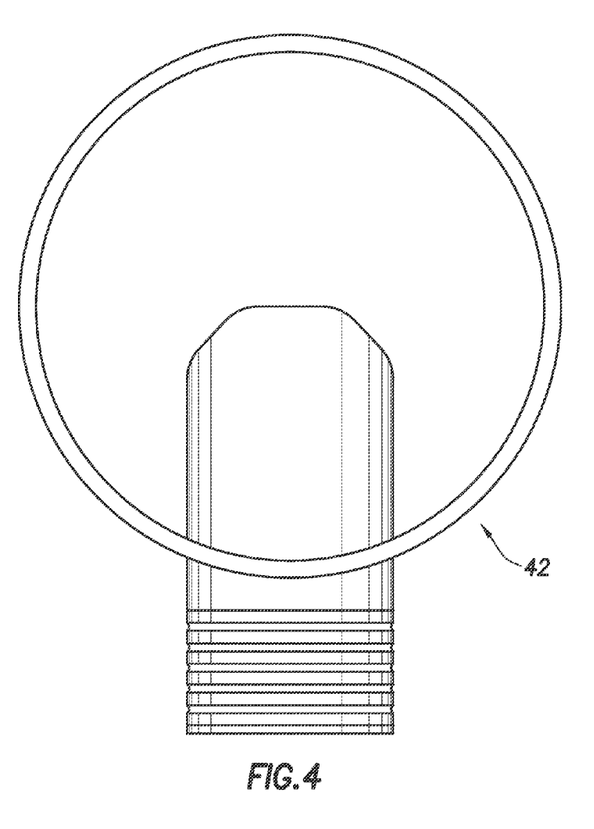
FIGS. 4 and 6B show embodiments of a capture nozzle to capture turbo pressure to route it to the unit.

FIG. 3 is a schematic illustration of a supplementary intercooler system embodying principles of the present invention. In operation, air flow from turbocharger 61 is sent to the unit or bypassing the unit via one or more of valves 53, 54 and/or 55 which control and balance the air flow. When pressure transducer 23 senses a preselected turbo pressure, switch 24 closes the circuit with battery 19, activating pump 20 to transfer water from the water tank 51 into main body casing 11. Hydrogen is produced in the main body 11 and routed to the engine 62. The circuit could also be configured so that pump 20a transfers other fuels such as methane, helium, etc. from additive tank 52 into main body casing 11 when switch 24 is actuated.

Figure 5:
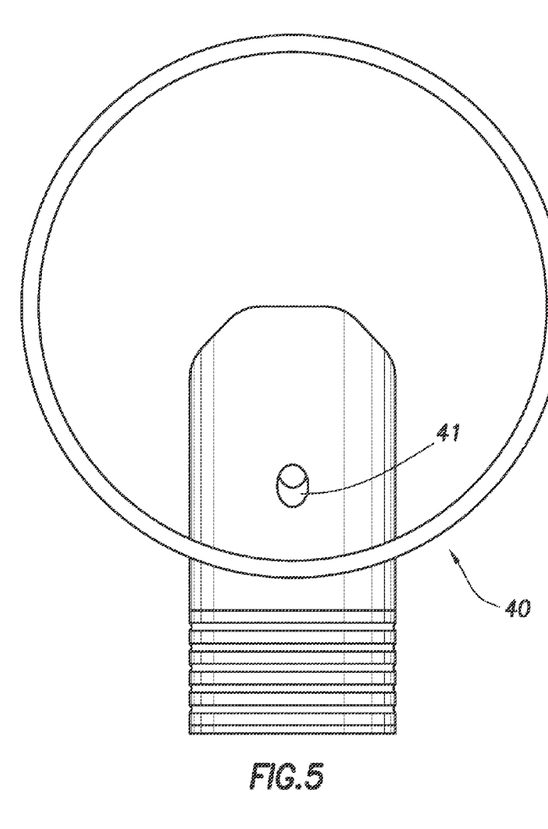
FIGS. 5 and 6C show embodiments of a venturi-style injector nozzle that may be placed into the intake manifold of a car or truck engine.
Figure 6A:
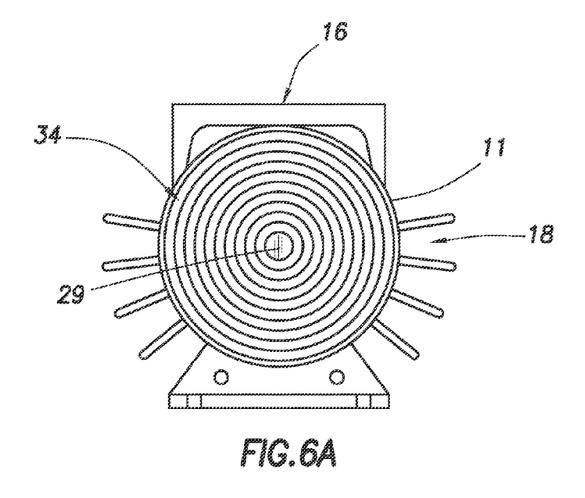
FIG. 6A is a sectional view showing coils of a supplementary intercooler as viewed from the inlet side according to an embodiment.
Figure 6B:
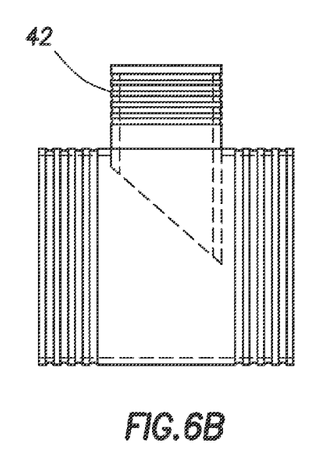
Figure 6C:
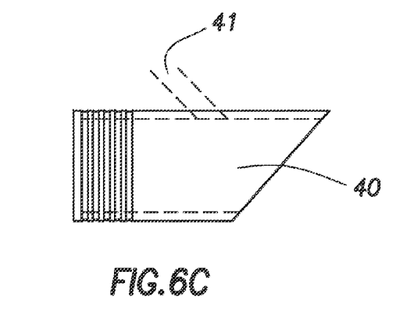

FIGS. 5 and 6C show a venturi style injector nozzle that is placed into the intake manifold of a car or truck engine (not shown) according to an embodiment to keep the turbo-pressure from equalizing. The nozzle 40 is preferably designed with a hole 41 drilled into the back of the nozzle at about a 45 degree angle. As the air is forced through this hole, it creates a vacuum signal, the same principle the way an insecticide sprayer works. This then gives the hydrogen steam and moisture droplets direction to enter into the intake manifold.

Figure 6D:
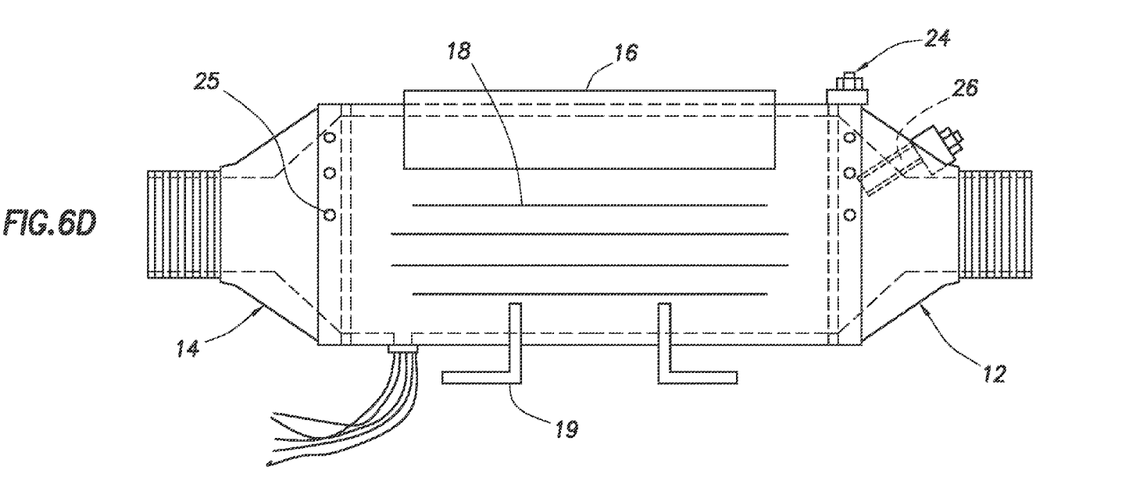
FIG. 6D is a side elevation view partly in cross section of a supplementary intercooler embodying principles of the present invention.
Figure 6E:
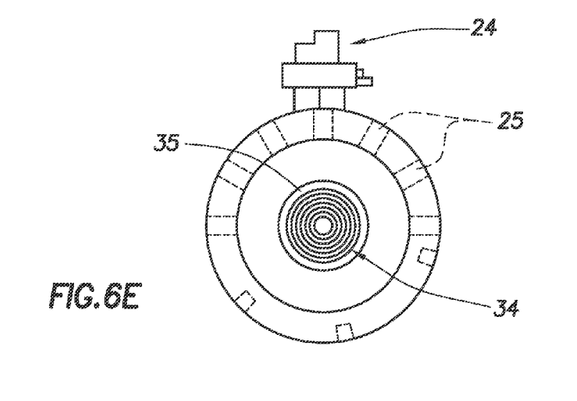
FIG. 6E is a cross section showing a pressure switch and capacitor coils of a supplementary intercooler as viewed from the outlet side in accordance with an embodiment.

In one embodiment, on the inlet cone 12, there are seven (7) threaded ports 25. Those that are not used, are capped. Both inlet and outlet sides of the cones may have these ports and may be configured the same. One of the ports may be used for the pressure switch 24 on one end, the inlet portion 12, of the cone. Other fuels, such as methane, helium, etc., can be added, if desired, to the air intake via one or more of the other available ports. In the example of FIG. 6D, inlet cone 12 has a 23 degree ¼ inch tapped port. This port is used for the injector nozzle 26. A ¼-⅛ inch reducer is placed into this port. The reducer is of Teflon® and is to prevent the transference of heat to the injector nozzle. The injector stem is also insulated with silicone rubber. All this keeps the injector from experiencing heat vapor locking.

In the example of FIG. 6D, the main body 11 has a water pump platform 16 welded onto it. It has eight (8) press-fit cooling fins 18 attached to the body housing, two (2) mounting brackets 19 welded onto it at the bottom of the unit, an ⅛ inch tap port for the capacitor wires to exit with a protective seal to prevent air leakage.

Ammonia hydroxide can be added to the water to further enhance hydrogen/nitrogen output. Also methanol can be added to the water to keep the water from freezing. Because of the design of the unit, running out of water will maintain a cool charge going into the intake manifold, comparable to a normal intercooler.

The benefits of this invention include:
 a) To give a much needed, cooler air charge into the engine.
 b) To continually keep the internal parts of the engine clean and free of soot, which also eliminates the need for soot recovery systems. This also lowers crank-case pressure.
 c) To lower combustion temperatures while giving a higher BTU rate to the fuel. Lowers the emissions. All these prolong engine life, lower oil temperatures, increase the horsepower, therefore, increases miles per gallon and does not require any computer manipulations in any form, fashion or way.

The invention can also be used with other systems for reducing intake air charge temperatures, such as conventional Air/Air and Liquid/Air intercoolers.

While this invention has been described with reference to illustrative embodiments, this description is not intended to be construed in a limiting sense. Various modifications and combinations of the illustrative embodiments as well as other embodiments of the invention, will be apparent to persons skilled in the art upon reference to the description. It is, therefore, intended that the appended claims encompass any such modifications or embodiments.

What is claimed is:

1. An intercooler system for cooling intake charge air passing engine air after it has passed through the turbocharger of a vehicle's turbocharged internal combustion engine, comprising:
 a main body housing;

wherein the main body housing further includes having an inlet for capturing at least a portion of the intake charge air coming from the turbocharger and an outlet for routing the intake charge air to the engine after passing through the intercooler;

an electrolyzer positioned in the main body housing for producing hydrogen from water;

a water container for holding water;

a water pump for pumping water from the water container to the electrolyzer to be converted into the hydrogen;

an injector for injecting the hydrogen into the intake charge air which is delivered into the engine;

a pressure transducer for sensing an air intake charge pressure; and an electric switch, being connected to said pressure transducer, for activating the water pump and the electrolyzer when the air intake charge pressure has reached a set pressure.

2. The intercooler system as in claim 1, wherein the means electric switch for activating the water pump and the electrolysis means is a pressure switch responsive to the air intake charge pressure passing through the intercooler.

3. The intercooler system as in claim 1, further including a bypass for diverting at least a portion of the intake charge air around the main body housing intercooler and routing said at least portion of the intake charge air to the engine.

4. The intercooler system as in claim 1,
wherein the electrolyzer capacitor includes coils;
wherein the capacitor coils comprise positive and negative plates rolled together.

5. The intercooler system as in claim 4, wherein the electrolyzer includes a magnetic rod is being placed at a center of the capacitor coils.

6. The intercooler system as in claim 1, further comprising a venturi-style nozzle at an intake manifold for routing the intake charge air to the engine after passing through the intercooler and to assist the intake charge air pressure to move the intake charge air in one direction to the engine.

7. The intercooler system as in claim 6, wherein the venturi-style nozzle has a hole drilled into a back of the venturi-style nozzle at about a 45 degree angle, so that as the intake charge air is being forced through the hole creates a vacuum signal.

8. The intercooler system as in claim 1, further including a negatively charged injector nozzle positioned to spray a water mixture into the intake charge air, to further reduce intake charge temperature through evaporative cooling.

9. The intercooler system as in claim 1, further comprising a plurality of cooling fins attached to the main body housing.

10. The intercooler system as in claim 1, wherein the electrolyzer is connected to the vehicle's battery which runs a current through the water extracting the hydrogen.

11. A method for cooling intake charge air engine air in a vehicle's turbocharged internal combustion engine including an intercooler system with an intercooler main body housing; an electrolyzer; a water container; a water pump; a hydrogen injector; a pressure transducer; and an electric switch; the method comprising the steps of:

capturing at least a portion of the intake air charge from a turbocharger;

pumping water from the water container to the electrolyzer;

producing hydrogen with the electrolyzer positioned in the intercooler main body housing sensing an air intake charge pressure with the pressure with the pressure transducer; and injecting the hydrogen into the intake charge air when the intake charge air has reached a set pressure; and routing a mixture of the intake charge and the hydrogen the cooled air charge to the engine.

12. A The method for cooling intake charge air in a vehicle's turbocharged internal combustion engine as in claim 11, wherein the step of producing the hydrogen comprises extracting the hydrogen from water using an electrical current.

13. The method intake charge air in a vehicle's turbocharged internal combustion engine as in claim 12, wherein the step of extracting the hydrogen from water comprises:

providing positive and negative plates, being formed by rolling sheets of metal;

placing a magnetic rod at a center of the rolled positive and negative plates;

positively charging the water, then transferring the positively charged water to a negatively charged injector nozzle which sprays the water onto positive and negative plates to produce the hydrogen.

14. The method intake charge air in a vehicle's turbocharged internal combustion engine as in claim 12, further comprising the step of adding a catalyst to the water to increase an efficiency of the in producing a desired amount of the hydrogen with less electricity.

15. The method intake charge air in a vehicle's turbocharged internal combustion engine as in claim 11, further comprising the step of injecting a water mixture into the intake charge air, to further reduce intake charge temperature through evaporative cooling.

16. The method intake charge air in a vehicle's turbocharged internal combustion engine as in claim 11, further comprising the step of placing a venturi- style injector nozzle into an intake manifold of the vehicle's engine.

17. The method intake charge air in a vehicle's turbocharged internal combustion engine as in claim 16, wherein the venturi-style nozzle has a hole drilled into a back of it the venturi-style nozzle at about a 45 degree angle, so that as the intake charge air is being forced through the hole creates a vacuum signal.

18. The method intake charge air in a vehicle's turbocharged internal combustion engine as in claim 11, further comprising the step of diverting excess turbo pressure around the unit intercooler main body housing.

* * * * *